United States Patent [19]
Felter et al.

[11] 3,877,357
[45] Apr. 15, 1975

[54] HINGED DOOR STRUCTURE AND VENTILATORS INCORPORATING THE SAME

[76] Inventors: John V. Felter; Kenneth M. Rudine, both of 1307 Ashland, Houston, Tex. 77008

[22] Filed: Jan. 2, 1973

[21] Appl. No.: 320,101

[52] U.S. Cl. .................. 98/43; 98/116; 49/261; 49/397; 137/527.8
[51] Int. Cl. ............................................. F24f 7/06
[58] Field of Search .......... 49/397, 261; 98/116, 43; 137/527.8

[56] References Cited
UNITED STATES PATENTS
2,549,110  4/1951  Michael ........................... 49/397 X
3,335,654  8/1967  Killam ................................. 98/43

Primary Examiner—Meyer Perlin
Assistant Examiner—Ronald C. Capossela
Attorney, Agent, or Firm—Carl B. Fox, Jr.

[57] ABSTRACT

Hinged door structure and ventilation equipment using the same, wherein the door is formed by a flat plate having a bent edge which is disposed through a slot. Air pressure at one side of the door will lift it to open, while absence of air pressure results in closing of the door.

7 Claims, 4 Drawing Figures

HINGED DOOR STRUCTURE AND VENTILATORS INCORPORATING THE SAME

SUMMARY OF THE INVENTION

According to the invention, a hinged door structure and ventilators using the hinged door structure are provided. The door structure is extremely simple in construction yet is reliable in use. The door structure includes only two parts. One part, the door itself, consists of a flat plate having an edge strip bent to an angle greater than ninety degrees. The other part, an angularly shaped member, forms a slot through which the bent edge strip of the door is disposed. The bent edge strip of the door retains the door connected at the slot, and the door may be moved to open in one direction, and closes when not urged to open.

The doors afforded according to this invention are particularly useful in connection with ventilation equipment, and ventilation equipment incorporating the same is presented herein. The door, installed in an outlet from a motor driven ventilator apparatus, will open when the apparatus is in operation and air pressure behind the door raises it to open, and will close when the air pressure is not present, as when the ventilation apparatus is not operating.

The invention affords door apparatus which is reliable and dependable, and which has only two parts, and which is extremely economical.

Other objects and advantages of the invention will appear from the following detailed description of a preferred embodiment, reference during the description being made to the accompanying drawings.

BRIEF DESCRIPTIONS OF THE DRAWINGS

DESCRIPTION OF THE PREFERRED EMBODIMENT

Figure 1:
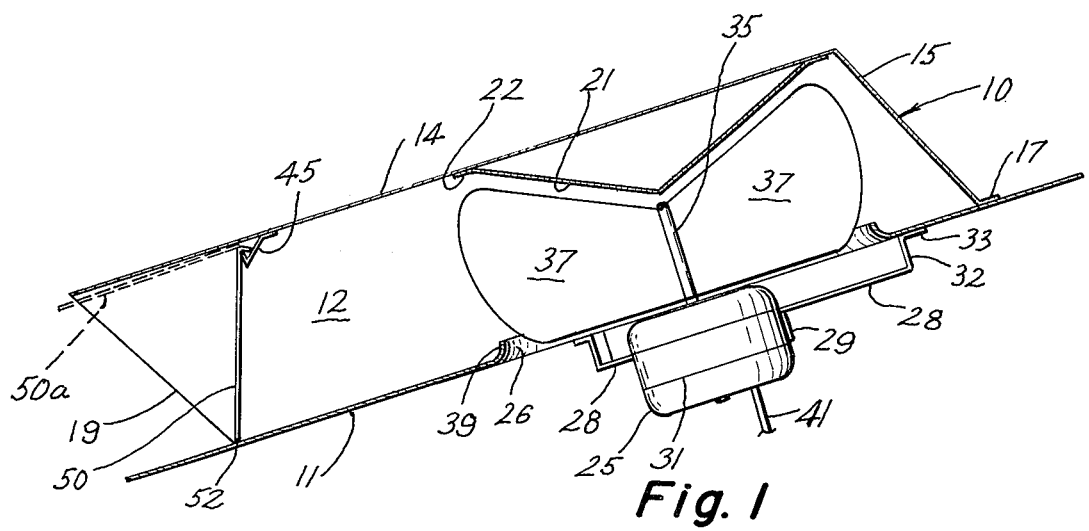
FIG. 1 is a vertical cross section taken through the center of a door and ventilation apparatus incorporating the door, of preferred form according to the invention.

The preferred form of door according to the invention which is shown in the drawings is shown incorporated into a motor-driven ventilator apparatus 10, which is also of preferred form. Apparatus 10 has an open ended housing formed by a bottom wall or panel 11 shown disposed upon an inclined roof surface, side walls 12, 13, top or roof 14 and rear wall 15. The top and side walls may be formed as shown of a single metal sheet which is cut and bent to box form and welded or otherwise suitably connected at the box corners. A narrow outturned flange 17 is formed around the lower edges of walls 12, 13 and 15, and is connected against bottom wall 11 by brazing, tack welding or riveting, or in other suitable manner. The front edges of walls 12 and 13 are identically inwardly inclined downwardly, the inclined front edge 19 of wall 12 being shown in FIG. 1. The rearward ends of walls 12, 13 are inclined outwardly downwardly, so that back wall 15 is similarly inclined. The top 14 is parallel with bottom 11. The outwardly extending edges of bottom 11 serve as flashing for sealing the ventilator to a roof.

An inverted cone 21 formed of sheet metal or other suitable material has narrow surrounding flange 22 which is affixed by welding, tack welding, brazing, or other suitable manner to the underside of top wall 14. Cone 21 is positioned off-center near a rear corner of the apparatus as will be clear by inspection of FIGS. 1 and 2, cone 21 being closer to walls 13, 15 and farther from wall 12 and the front of the housing. An electric motor 25 is supported adjacent an opening 26 of circular shape formed through bottom 11 directly beneath cone member 21. The motor 25 is supported by plural brackets 28, three being indicated, which are each bent downwardly at their ends 29 and affixed to a metal bank 31 tightly engaged about the motor. At their outer ends, the brackets 28 are bent upwardly at 32 and outwardly at 33 and affixed at the underside of bottom 11 around the edges of opening 26. The shaft 35 of motor 25 is directed upwardly through opening 26 to terminate a short distance away from the apex of cone 21, and plural fan or blower blades 37 are fixed thereto equally circularly spaced radially thereof. Vanes 37 are usually pitched to improve their efficiency. The blower rotation is such that air indrawn through opening 26 is impelled along the back 15 toward the opposite back corner from cone 14 and then to the outlet at the front of the ventilator box or housing. Opening 26 is formed to have a venturi flange 39 therearound.

An electrical conductor 41 supplies electrical energy for operation of motor 25, and a suitable switch or other control may be provided.

Figure 2:
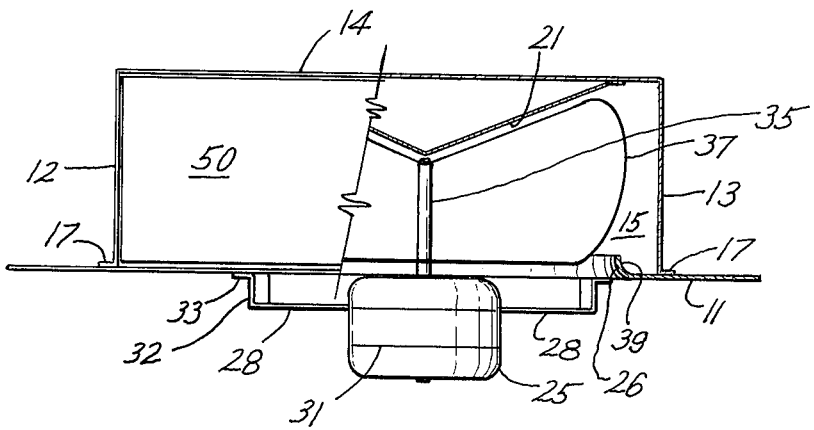
FIG. 2 is a front elevation, partly in vertical cross section, of the apparatus shown in FIG. 1.
Figure 3:
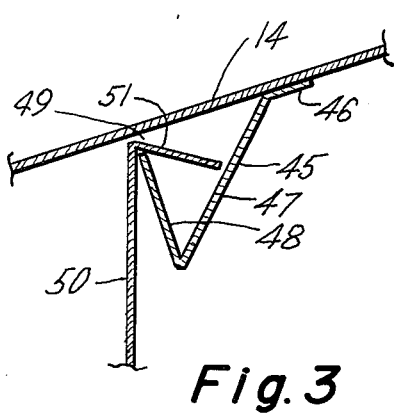
FIG. 3 is an enlarged partial vertical cross section taken transversely of the door shown in FIGS. 1 and 2, showing the door in closed position.
Figure 4:
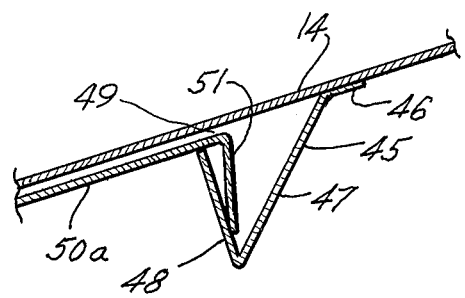
FIG. 4 is an enlarged partial vertical cross section similar to FIG. 3, showing the door in open position.

The air outlet from the ventilation apparatus is shown at the left hand side of FIG. 1, the air passing outwardly between walls 11, 12, 13 and 14. Inwardly of the front edge of top 14 there is affixed a shaped plate or strip 45, extending crossways between walls 12, 13. Strip 45 is bent as is best seen in FIGS. 3–4 to have a flange 46 flatly affixed against the underside of top 14, an angularly downturned portion 47 and an upturned portion 48. A slot 49 is formed above the upper edge of strip portion 48.

The door 50 is in the form of a flat sheet or plate of sheet metal having along its upper edge an edge strip or flange 51 which is bent to an angle somewhat greater than ninety degrees. The lower edge 52 of door plate 50 rests angularly against bottom 11 along a line coincedent with the lower front corners of walls 12 and 13. The angularity of the door plate 50 prevents the door from being moved toward the right, as shown in FIG. 1, in such manner as to permit edge flange 51 to be withdrawn from slot 49.

The strip portion 48 is perpendicular to top wall 14. Door flange 51 is at an angle a little less than ninety degrees with respect to door 50, since it is bent somewhat greater than ninety degrees. Therefore, flange 51 will engage strip portion 48 before door 50 is fully opened to position 50a. The lower edge of flange 51 is therefore engaged with strip portion 48 when the door is fully open in position 50a. While the door is being opened or closed, the lower edge of flange 51 moves past strip portion 47, barely missing it, portion 47 being at an angle providing this small clearance. The purpose of this small clearance is so that should the door be pushed back into slot 49 after it has been opened, the lower edge of flange 51 will engage portion 47 so that the door will not enter slot 49 to such an extent that it will become locked open between the top 14 and the lower edge of slot 49. Therefore, the door will always close when air flow is shut off or when released.

Referring now to FIG. 1, door plate 50 opens to a position 50a. Referring also to FIGS. 3 and 4, when door plate 50 is opened, the bent disposition of portion 51 to an angle greater than 90° provides that the part of the door plate adjacent edge flange 51 will slide on the upper edge of strip portion 48. Comparing FIGS. 3 and 4, with the door 50 in closed position shown in FIG. 3, the upper edge of strip portion 48 is within the bend between the main body of the door plate and edge flange 51. In FIG. 4, the upper edge of strip portion 48 is moved away from the bend between door 50 and edge flange 51. The overbending of the edge flange of the door is necessary because it prevents movement of the edge flange out of the slot above strip portion 48, and insures that the door will be firmly connected against removal.

When the blower is operated, blades 37 impel air upwardly through opening 26 and against the back side of door 50. The air pressure moves the door upwardly to position 50a. When the blower is stopped, door 50 drops downwardly to its lower position to close the front opening of the ventilator. The angularity of door 50 prevents the door from becoming jammed in closed position, since its lower edge strikes the bottom 11 at an outward angle.

The ventilator 10 is shown in the drawings to be disposed upon a pitched roof. The angularity of door 50 with respect to the ventilator housing is such that door 50 is vertical in closed position. This is not necessary to the invention, but it will be realized that if the ventilator were installed upon a roof of greater pitch, then the door 50 would not completely close along its bottom. However, the door may be completely closed when the pitch of the roof is less than shown. The vertical width of the door may be adjusted to accommodate any pitch of a roof.

The simplicity of the door structure herein shown will be apparent. Only the door plate 50 and shaped strip 45 are required to form the door structure in conjunction with a wall structure such as top 14. In spite of its simplicity, the hinged door structure herein afforded is entirely reliable and quiet in operation, and subject to long useful life. Ventilators incorporating the door have improved performance, since the door prevents entry of rain, dust, insects, birds, and other objects into the ventilator when it is not operating. When the ventilator is operating and the door is in position 50a, the outflow of air prevents entry into the ventilator. During months when the ventilator is not used, it is not necessary to provide any auxiliary closure or cover for the ventilator.

The ventilator and door have been described as being made of sheet metal, such as galvanized iron or aluminum, but other materials such as plastics and fiber board and the like may be used.

While a preferred embodiment of apparatus has been described and shown in the drawings, many modifications thereof may be made by a person skilled in the art without departing from the spirit of the invention, and it is intended to protect by Letters Patent all forms of the invention falling within the scope of the following claims.

We claim:

1. Door assembly, comprising a door member of flat form disposed in a generally vertical direction when closed and having a rearwardly depending flange along its upper edge at an angle not exceeding 90° therewith, wall means disposed transversely rearwardly of said door member uniformly closely spaced from the angle between said door member and said flange, strip means connected at one edge to said wall means rearwardly of said door and shaped angularly downwardly toward said door member and then vertically upwardly to terminate at its opposite edge extending beneath the angle of said flange with said door member, the space between said opposite edge of said strip means and said wall means being less than the rearward extent of said flange from said door member, said door member being pivotally movable forwardly from said closed position to an open position adjacent said wall means by sliding movement of the rear surface of said door member over said opposite edge of said strip means, said flanged edge of said door member preventing removal of said door member in all pivotal positions thereof, the flanged edge of said door member being sufficiently long from the angle of said flange with said door member to the edge of said flange as to engage the angularly downward portion of said strip means when said door member is opened to limit the inward movement of said angle to prevent said door member from becoming locked in open position.

2. The combination of claim 1, the weight of said door member causing movement of said door member from open to closed position, the outer edge of said flange being in contact with the inward side of said upwardly shaped portion of said strip means when said door member is in said open position.

3. The combination of claim 1, said downwardly shaped portion of said strip means extending downwardly and forwardly toward the rearward side of said door member, and said upwardly shaped portion of said strip means extending upwardly perpendicular to said wall means.

4. The combination of claim 3, said angle between said flange and said door member being somewhat less than 90°.

5. The combination of claim 4, said angle between said flange and said door member being between about 65° and about 85°.

6. Door assembly in combination with a motor powered ventilator, said door assembly being for closing the air outlet of the ventilator, comprising a door member of flat form disposed in a generally vertical direction when closed and having a rearwardly extending flange along its upper edge at an angle not exceeding 90° therewith, wall means disposed transversely of said door member uniformly closely spaced from said flanged edge of said door member, strip means connected at one edge to said wall means rearwardly of said door and shaped downwardly and then upwardly to terminate at its opposite edge extending beneath the angle of said flange with said door member, said door member being pivotally movable forwardly from said closed position to an open position adjacent said wall means by sliding movement of said door member over said opposite edge of said strip means, said flanged edge of said door member preventing removal of said door member in all pivotal positions thereof, said wall forming the top side of the air outlet from said ventilator apparatus and said door member fitting said air outlet to close the same when said door member is in said closed position.

7. The combination of claim 6, the bottom edge of said door member contacting the bottom of said air outlet at a forward angle when said door member is in said closed position.

* * * * *